Jan. 26, 1960     R. J. HAUGLAND ET AL     2,922,660
HYDRAULIC CONTROL FOR DRAWBAR AND HITCHES
Filed Sept. 7, 1956     2 Sheets-Sheet 1

Raymond J. Haugland
Horace S. Stevenson
INVENTORS

Jan. 26, 1960          R. J. HAUGLAND ET AL          2,922,660
HYDRAULIC CONTROL FOR DRAWBAR AND HITCHES
Filed Sept. 7, 1956                                    2 Sheets-Sheet 2
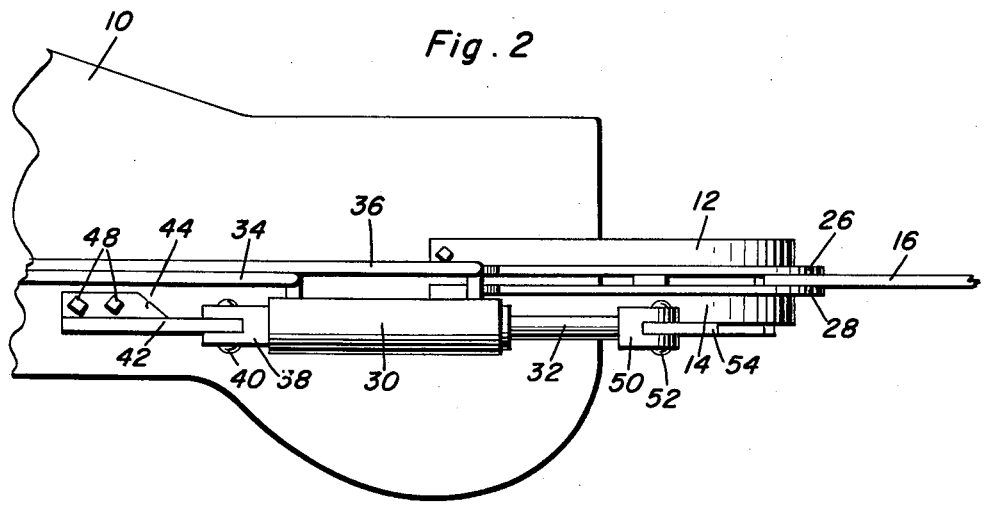
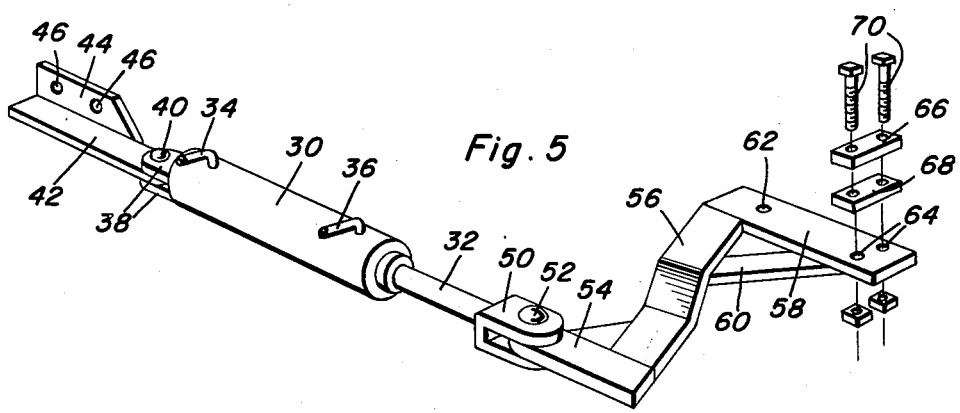
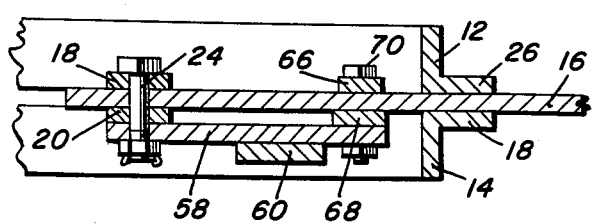
Raymond J. Haugland
Horace S. Stevenson
    INVENTORS

United States Patent Office 2,922,660
Patented Jan. 26, 1960

2,922,660

HYDRAULIC CONTROL FOR DRAWBAR AND HITCHES

Raymond J. Haugland and Horace S. Stevenson, Bozeman, Mont.

Application September 7, 1956, Serial No. 608,452

3 Claims. (Cl. 280—468)

This invention comprises a novel and useful hydraulic control for drawbar and hitches and more particularly relates to an attachment applicable to conventional tractors and the drawbar of apparatuses connected thereto to provide a hydraulically operated power means for causing horizontal pivotal swinging movement of the drawbar relative to the tractor in either direction.

The primary purpose and object of this invention is to provide an attachment applicable to conventional tractors and the drawbars and implements operatively connected thereto whereby the operator of the tractor is enabled to shift and hold the drawbar in an extreme left or extreme right pivoted position relative to the tractor, without stopping the latter, and while the tractor is pulling its maximum load.

A further object of the invention is to provide a device in accordance with the foregoing object wherein the pivoting of the drawbar relative to the tractor may be effected by a power operated or hydraulic means.

Yet another object of the invention is to provide a device in conformity with the above mentioned objects which may be readily applied to conventional tractors and drawbar constructions.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 2 is a side elevational view of the arrangement of Figure 1;

Figure 4 is a further detail view taken upon an enlarged scale substantially upon the plane indicated by the section line 4—4 of Figure 1; and, Figure 5 is a perspective view of the power operated attachment in accordance with this invention.

Figure 1:
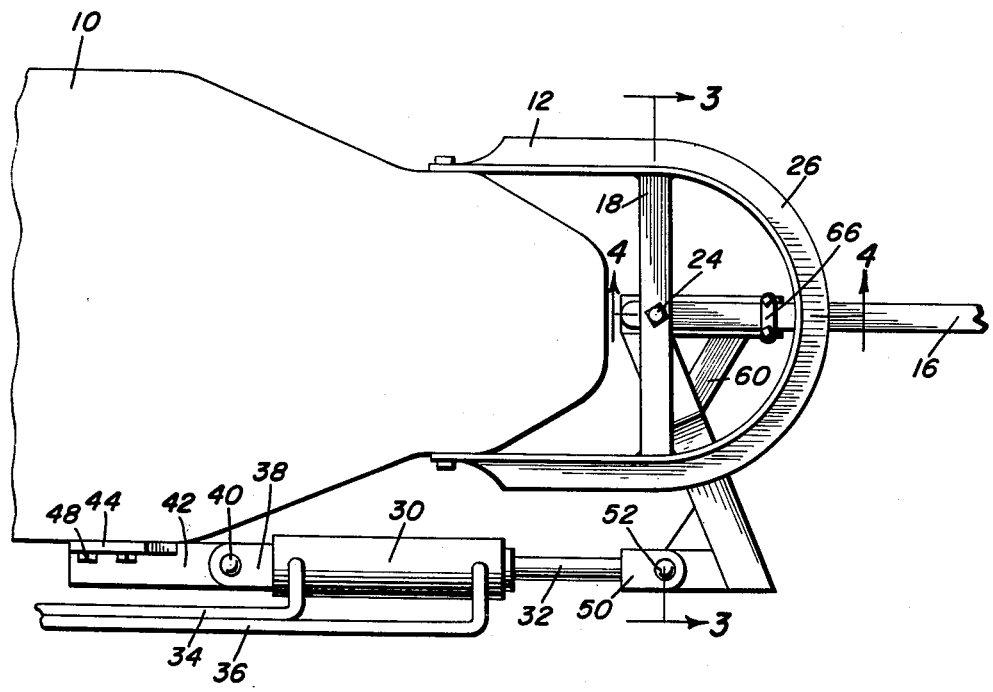
Figure 1 is a top plan view showing a portion of a tractor and of a drawbar construction associated therewith, and to which the hydraulic attachment of this invention has been operatively applied.

In the accompanying drawings the numeral 10 designates generally the rear portion of any conventional form of tractor, the same being provided with a rearwardly extending U-shaped bracket having upper and lower portions 12 and 14 and constituting the drawbar coupling of the tractor to which the front end of the drawbar 16 carried by an implement, vehicle or other device which is to be coupled to the tractor, is operatively associated. As will be best apparent from Figure 3, the drawbar bracket is provided with a transversely disposed brace member 18 which is welded at its ends to the two legs of the upper drawbar section 12, while a lower brace member 20 having a central depressed portion 22 is positioned between the upper and lower drawbar coupling assembly sections 12 and 14, and is welded to the latter.

By means of a king bolt 24 the drawbar is pivotally connected to the upper and lower transverse brace members 18 and 20 for horizontal swinging movement, the drawbar thus extending between upper and lower horizontally extending flanges 26 and 28 of the sections 12 and 14 for guided horizontal swinging movement therebetween.

The power operated attachment of this invention provides a power means whereby the drawbar 16 may be pivoted horizontally about its king bolt 24 to either its right end or left end position, as desired. For this purpose, the attachment consists of a hydraulic cylinder and piston ring indicated generally by the numeral 30 having a piston rod 32, and provided with fluid pressure conduits 34 and 36 whereby the piston rod may be moved in either direction selectively. The cylinder unit at one end is provided with ears or bifurcated lugs 38 which are pivotally connected as by a pivot pin 40 to one end of a bracket 42. The latter has a perpendicular flange 44 apertured as at 46 whereby the same may be secured as by the fastening bolts 48 to any convenient portion of the tractor 10.

The piston rod 32 at its end is provided with a bifurcated extremity 50 which by means of a pivot pin 52 is secured to one extremity 54 of a lever arm 56 having at its other end a terminal portion 58 which extends in the opposite direction to and is generally parallel to the end 54. A suitable brace 60 is welded or otherwise secured to the members 56 and 58 to provide a rigid bracing for the same.

The member 50 is provided with an aperture 62 adjacent its junction with the lever member 56, and with a further pair of apertures 64. A pair of apertured plates 66 and 68 together with bolts 70 cooperate with the apertures 64.

Figure 3:
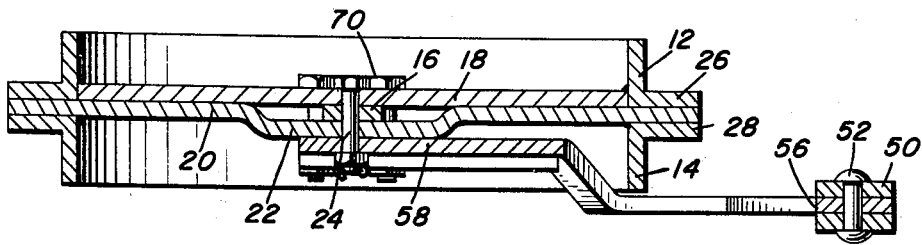
Figure 3 is a detail view taken upon an enlarged scale in vertical transverse section substantially upon the plane indicated by the section line 3—3 of Figure 1.

In applying the attachment to the drawbar construction of a tractor and trailer element, the drawbar 16 is disposed as shown in Figure 3 between the transverse brace members 18 and 20, above the recessed portion 22 of the latter. The king pin 24 extends through the drawbar, through aligned apertures in the braces 18 and 22, and through the aperture 62 of the lever terminal portion 58. The lever portion 56 then extends laterally from the drawbar coupling assembly, projecting beneath the drawbar section 14, as shown in Figures 2, 3 and 4. The lever terminal portion 58 is disposed beneath the drawbar 16 and the lower cross brace portion 20, with the spacer plate 68 being disposed between the same and the lower surface of the drawbar, while the plate 66 rests upon the top of the drawbar, with the fastening bolt 70 being secured therebetween to rigidly clamp the member 58 to the drawbar 16.

It will now be apparent that the lever 56 is detachably but rigidly secured to the drawbar 16 by means of the fastening bolt 70, and the king pin 24, whereby the drawbar 16 may be caused to swing horizontally about the king pin. Upon actuation of the hydraulic cylinder and piston unit 30, by a means of any conventional type, not shown, it is evident that a predetermined horizontal swinging movement of the drawbar may be secured in either direction about the king pin 24, thereby enabling the operator of the tractor to position the drawbar and the implement carried thereby at any desired angular relation with respect to the direction of travel of the tractor. This greatly facilitates the operation of the tractor as, for example, in making sharp turns in operating in very soft ground, upon a hillside and the like.

It will be understood that the bracket member 42 with its apertures 46 may be so constructed as to adapt the same to fit upon various conventional types of tractors, upon various portions of the frame thereof; while the lever 56 with its terminal portion 58 will also be constructed in such a manner as to adapt the same to fit different constructions of drawbars.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A power operated drawbar and hitch assembly comprising a pair of vertically spaced and horizontally extending, U-shaped complementary upper and lower brackets, means for securing said brackets in rearwardly projecting position upon the rear portion of a tractor, a pair of vertically spaced complementary upper and lower brace members each secured to and extending between the legs of one of said U-shaped brackets, a drawbar disposed between the pair of brackets and between the pair of brace members and movably supported thereby, a vertical pivot pin extending through said brace members and said drawbar and connecting the latter to the former for horizontal swinging movement between said brackets, a lever secured to said drawbar at the underside thereof and extending laterally therefrom and beneath said lower bracket to the exterior of the latter, a fluid pressure operated cylinder and piston unit disposed along the exterior of said brackets, means connecting said unit to the lever exteriorly of said bracket and fastening means for mounting said unit upon said tractor.

2. The combination of claim 1, wherein said lever is pivoted upon said vertical pivot pin and means rigidly securing said lever to said drawbar.

3. A power operated drawbar and hitch assembly comprising a pair of vertically spaced and horizontally extending, U-shaped complementary upper and lower brackets, means for securing said brackets in rearwardly projecting position upon the rear portion of a tractor, a pair of vertically spaced complementary upper and lower brace members each secured to and extending between the legs of one of said U-shaped brackets, a drawbar disposed between the pair of brackets and between the pair of brace members and movably supported thereby, a vertical pivot pin extending through said brace members and said drawbar and connecting the latter to the former for horizontal swinging movement between said brackets, a lever secured to said drawbar at the underside thereof and extending laterally therefrom and beneath said lower bracket to the exterior of the latter, a fluid pressure operated cylinder and piston unit disposed along the exterior of said brackets, means connecting said unit to the lever exteriorly of said bracket and fastening means for mounting said unit upon said tractor, said lever being pivoted upon said vertical pivot pin and being disposed beneath and abutting against the lower brace member in side-by-side relation, a clamp rigidly securing said lever to said drawbar, said clamp being located within the confines of said U-shaped brackets.

References Cited in the file of this patent

UNITED STATES PATENTS

| | | |
|---|---|---|
| 1,518,311 | Davis | Dec. 9, 1924 |
| 1,962,423 | Brown | June 12, 1934 |
| 2,600,016 | Miller | June 10, 1952 |
| 2,771,306 | Ash | Nov. 20, 1956 |

FOREIGN PATENTS

| | | |
|---|---|---|
| 619,744 | Great Britain | Mar. 14, 1949 |